United States Patent Office.

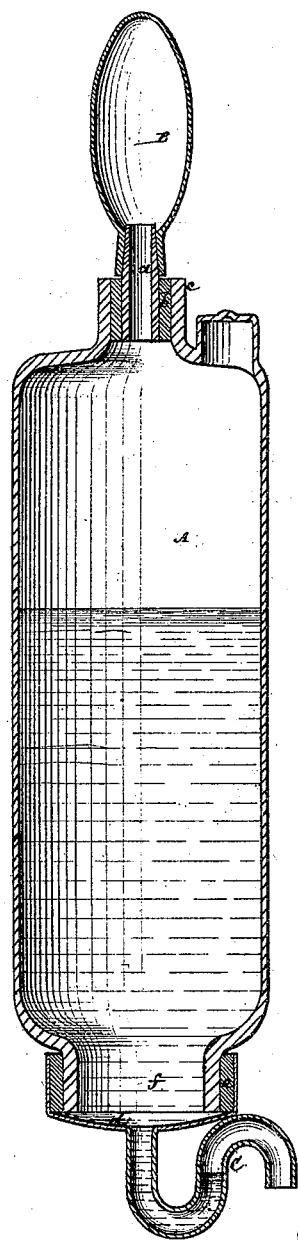

JOHN MATTHEWS, JR., OF NEW YORK, N. Y.

*Letters Patent No. 98,177, dated December 21, 1869.*

IMPROVEMENT IN SIRUP-DISPENSING APPARATUS.

The Schedule referred to in these Letters Patent and making part of the same.

*To all whom it may concern:*

Be it known that I, JOHN MATTHEWS, Jr., of the city, county, and State of New York, have invented a new and useful Improvement in Apparatus for Dispensing Sirups and other liquids, of which the following is a full, clear, and exact description, reference being had to the accompanying drawing, forming part of this specification, and which represents a longitudinal or vertical section of an apparatus for dispensing sirups and other liquids, constructed in accordance with my invention.

While applicable to dispensing various liquids, it will suffice here to describe the invention as applied to dispensing sirups for mixture with soda-water and other like beverages.

The general principle upon which my invention operates is that alleged to have been discovered by Torricelli, in which liquid contained in a tube, closed at the top, but open at the bottom, is supported or restrained from escaping by the pressure of the outside atmosphere, as against the weight of the column and partial vacuum above said column or liquid in the upper portion of the tube, and whereby an equilibrium is established.

Taking this principle as a basis, my invention consists in a combination, with such tube or vessel, of an air-compressing and exhausting device applied to or connected with the upper portion of the tube, and a trap fitted to the latter, at or near its bottom, so that on working the air-controlling device at top of the tube or vessel, to compress the air within said vessel, the equilibrium between the inside and outside pressures is broken or destroyed, and a portion of the liquid contained in the tube or vessel discharged through the trap, and, on allowing said device to perform its exhausting-function, air is caused to rush through the liquid, to restore the equilibrium, the trap being a necessary adjunct in or to the apparatus, to secure to it its proper action, and serving to prevent dripping or waste.

Referring to the accompanying drawing—

A represents a tube or vessel for dispensing sirups for mixture with soda-water or other like beverages. The tube, vessel, or reservoir, may be made of glass, or any other suitable material, and of any desired length, size, and shape.

Said tube is hermetically sealed at the top, by means of a rubber hollow bulb, B, fitted at its lower and open end around a nozzle, *a*, which establishes communication between the interior of the bulb and upper portion of the vessel, and may be secured to or in the latter by passing it through a cork, *b*, applied to an upper neck, *c*, of said vessel.

Communicating with the bottom of the tube A, referably through a lid, *d*, fitted over a rubber packing, *e*, arranged around a neck or mouth, *f*, is a bent tube or trap, C, of a double-reversed U-shaped or other suitable form.

The vessel A may be partially filled with sirup by inverting it and removing the lid *d* for such purpose, when, on again putting on said lid, and holding the vessel in a vertical position, with its mouth *f* downward, a certain portion of the sirup will be discharged through the trap C, till the descent of the column causes a partial vacuum to be established within the upper portion of the tube above the sirup, which produces an equilibrium between the contents of the vessel and outside atmosphere. This temporary or primary discharge of sirup may, however, be materially checked by collapsing the bulb B, and holding it compressed during the insertion of the sirup into the vessel, as, on afterward relaxing the bulb, the air will be rarefied above the sirup, to aid in supporting the column. But in whatever way the equilibrium is first established, the after dispensing-action of or from the vessel remains permanent and uniform, and so that the sirup may be discharged in spirts or jets, as required, either in fixed and measured or variable quantities, accordingly as the bulb B is wholly or only partially compressed. Thus the compression of the bulb B, by the hand, serves to displace the air within it, and by condensing the air in the vessel above the sirup, to destroy the partial vacuum in the upper portion of the tube or vessel, and cause a certain amount of sirup to be expelled or discharged from the trap C; but, on releasing grasp of the bulb, and allowing it to spring back or relax, a partial vacuum above the sirup is again restored, and this, by the momentum of the column in discharging, slightly in excess of what is necessary to support the column, so that a small quantity of air rushes through the trap C, and up through the liquid, till the equilibrium is restored, and in the column adjusting itself within the vessel, the delivery-end or portion of the trap C is relieved of sirup, which prevents all dripping or waste.

A sirup or other liquid-dispensing apparatus, constructed to operate as described, is not only cheap, simple, and efficient, but may be rapidly and easily worked. In making such apparatus, it will be obvious that a piston, under control of a spring, may be substituted for the elastic bulb B, and a cup-form of trap for the bent pipe C, without changing the character of the invention.

What is here claimed, and desired to be secured by Letters Patent, is—

The combination of the trap C, tube or vessel A, and flexible bulb or piston-like device B, all arranged for operation as shown and described.

JOHN MATTHEWS, JR.

Witnesses:
FRED. HAYNES,
M. J. SHANLYS.